United States Patent
Iwakura et al.

[11] Patent Number: 6,134,415
[45] Date of Patent: Oct. 17, 2000

[54] ROLLER/BELT TYPE MULTIPLE COLOR IMAGE TRANSFER APPARATUS INCLUDING DECREASING CONTACT REGION WIDTHS BETWEEN SUCCESSIVE IMAGE SUPPORT/TRANSFER ROLLER PAIRS AND COMMON POWER SUPPLY FOR TRANSFER MEANS AND CHARGER MEANS

[75] Inventors: Yoshie Iwakura; Fumio Shimazu, both of Nara, Japan

[73] Assignee: Sharp Kabushiki Kaisha, Osaka, Japan

[21] Appl. No.: 09/217,042

[22] Filed: Dec. 21, 1998

[30] Foreign Application Priority Data

Dec. 24, 1997 [JP] Japan .................................. 9-354705

[51] Int. Cl.[7] ............................ G03G 15/01; G03G 15/16
[52] U.S. Cl. ............................ 399/299; 399/303; 399/313
[58] Field of Search .................................. 399/299, 303, 399/312, 313

[56] References Cited

U.S. PATENT DOCUMENTS

| | | | |
|---|---|---|---|
| 5,038,178 | 8/1991 | Hosoya et al. ............................ 399/313 |
| 5,119,139 | 6/1992 | Torisawa ................................. 399/299 |
| 5,469,248 | 11/1995 | Fujiwara et al. ...................... 399/313 X |
| 5,495,317 | 2/1996 | Matsuda et al. ...................... 399/313 X |
| 5,678,150 | 10/1997 | Takahashi et al. ........................ 399/299 |
| 5,794,110 | 8/1998 | Kasai et al. ............................... 399/299 |
| 5,873,016 | 2/1999 | Kurokawa et al. .................. 399/312 X |

FOREIGN PATENT DOCUMENTS

09022158  1/1997  Japan .
09050197  2/1997  Japan .

*Primary Examiner*—Fred L. Braun
*Attorney, Agent, or Firm*—David G. Conlin; David A. Tucker

[57] ABSTRACT

An idle roller on which a dielectric belt is wound is made up of a metal such as aluminum etc., and is used as a charging device. A voltage is applied to this idle roller from a d.c. power source. A sheet of paper is made to pass into and between this grounded idle roller (grounded via the dielectric belt) and the metal roller so that the paper is electrostatically attracted to the dielectric belt. The same d.c. power source which applies a d.c. voltage to the idle roller is connected to a multiple number of transfer rollers so as apply the same d.c. voltage to these transfer rollers.

6 Claims, 7 Drawing Sheets

ROLLER/BELT TYPE MULTIPLE COLOR IMAGE TRANSFER APPARATUS INCLUDING DECREASING CONTACT REGION WIDTHS BETWEEN SUCCESSIVE IMAGE SUPPORT/TRANSFER ROLLER PAIRS AND COMMON POWER SUPPLY FOR TRANSFER MEANS AND CHARGER MEANS

BACKGROUND OF THE INVENTION (1) Field of the Invention

The present invention relates to a color image forming apparatus comprising: a plurality of image supports on which toner images are formed; a plurality of transfer means arranged in series so as to be opposed to the corresponding. image supports and causing the toner images to transfer to a print medium; an endless dielectric belt running continuously and disposed between the toner supports and the transfer means; a charging means disposed upstream of the multiple transfer means for causing the dielectric belt to electrostatically attract print media thereto; and charge erasing and cleaning means disposed upstream of the charging means for erasing the charge on the dielectric belt and cleaning the leftover toner, wherein a plurality of toner images formed on the respective multiple toner supports are successively transferred to the conveyed print medium by the respective transfer means to form a color image.

(2) Description of the Prior Art

A conventional color image forming apparatus, as disclosed in Japanese Patent Application Laid-Open Hei 9 No.22,158, includes: multiple image forming portions each having a drum-type image support; transfer chargers successively transferring the images formed in the image forming portions to a single print medium which is conveyed by a transfer belt; and a suspending means for suspending the transfer belt in such a manner that the transfer belt is curved upwards toward the downstream side with respect to the conveyed direction of the print media or in the direction matching the rotation of the image supports, and the contact area between the image support and the print medium becomes greater as the print medium is conveyed from one image forming portion to the next.

Japanese Patent Application Laid-Open Hei 9 No.50,197, discloses a configuration in which a plurality of transfer rollers are arranged opposing respective photoreceptor drums with a conveyer belt held in between. In this configuration, each transfer roller is applied with a voltage from a common transfer voltage applying unit and is abutted against the conveyer belt with a predetermined nip width while their resistance is adjusted so that it decreases with respect to the order in which the associated photoreceptor drums are laid out.

In accordance with Japanese Patent Application Laid-Open Hei 9 No.22,158 and Japanese Patent Application Laid-Open Hei 9 No.50,197, both configurations need separate power sources: one as the transfer power source for applying a voltage to the transfer chargers or transfer rollers as the transfer means for transferring the toner image to print media; and one as the power source for applying a voltage to the transfer belt or the conveyer belt so as to electrostatically attract print media thereto. Therefore, these configurations needed many parts and hence became bulky and high in cost.

SUMMARY OF THE INVENTION

The present invention has been devised in view of the above problems and it is therefore an object of the present invention to provide a color image forming apparatus having a plurality of transfer means for transferring toner images onto print media, formed with an elastic material and arranged. in contact with a dielectric belt wherein a common d.c. power source is provided as the power source for the multiple transfer means and for the charging means, thereby making the apparatus compact.

The present invention has been achieved in order to attain the above object, so the present invention is configured as follows:

In accordance with the first aspect of the invention, a color image forming apparatus includes:

a plurality of image supports on which toner images are formed;

a plurality of transfer means arranged in series so as to be opposed to the corresponding image supports and causing the toner images to transfer to a print medium;

an endless dielectric belt running continuously and disposed between the toner supports and the transfer means;

a charging means disposed upstream of the multiple transfer means for causing the dielectric belt to electrostatically attract print media thereto; and charge erasing and cleaning means disposed upstream of the charging means for erasing the charge on the dielectric belt and cleaning the leftover toner, wherein a plurality of toner images formed on the respective multiple toner supports are successively transferred to the conveyed print medium by the respective transfer means to form a color image, and is characterized in that the multiple transfer means are formed of an elastic material and are arranged so as to be in contact with the dielectric belt; and a common d.c. power source is provided as the power source for the multiple transfer means and for the charging means.

Next, in accordance with the second aspect of the invention, the color image forming apparatus having the above first feature is characterized in that the volume resistivities of the multiple transfer means are set higher successively toward the upstream side.

In accordance with the third aspect of the invention, the color image forming apparatus having the above second feature is characterized in that the volume resistivities of the multiple transfer means are set higher successively toward the upstream side within the range from $10^3$ to $10^{11}$ $\Omega$ cm.

Further, in accordance with the fourth aspect of the invention, the color image forming apparatus having the above first feature is characterized in that a plurality of the transfer means are of an elastic roller form and the contact widths of the rollers with the dielectric belt are set narrower successively toward the upstream side.

In accordance with the fifth aspect of the invention, the color image forming apparatus having the above fourth feature is characterized in that the contact widths of the rollers with the dielectric belt are set narrower successively toward the upstream side within the range from 1.5 mm to 4 mm.

Finally, in accordance with the sixth aspect of the invention, the color image forming apparatus having the above first feature is characterized in that the charging means is formed of a conductive roller, or a comb-like or cylindrical brush.

DESCRIPTION OF THE PREFERRED EMBODIMENTS

The basic configuration of a color image forming apparatus of the present invention will be described with reference to FIG. 1.

Figure 1:
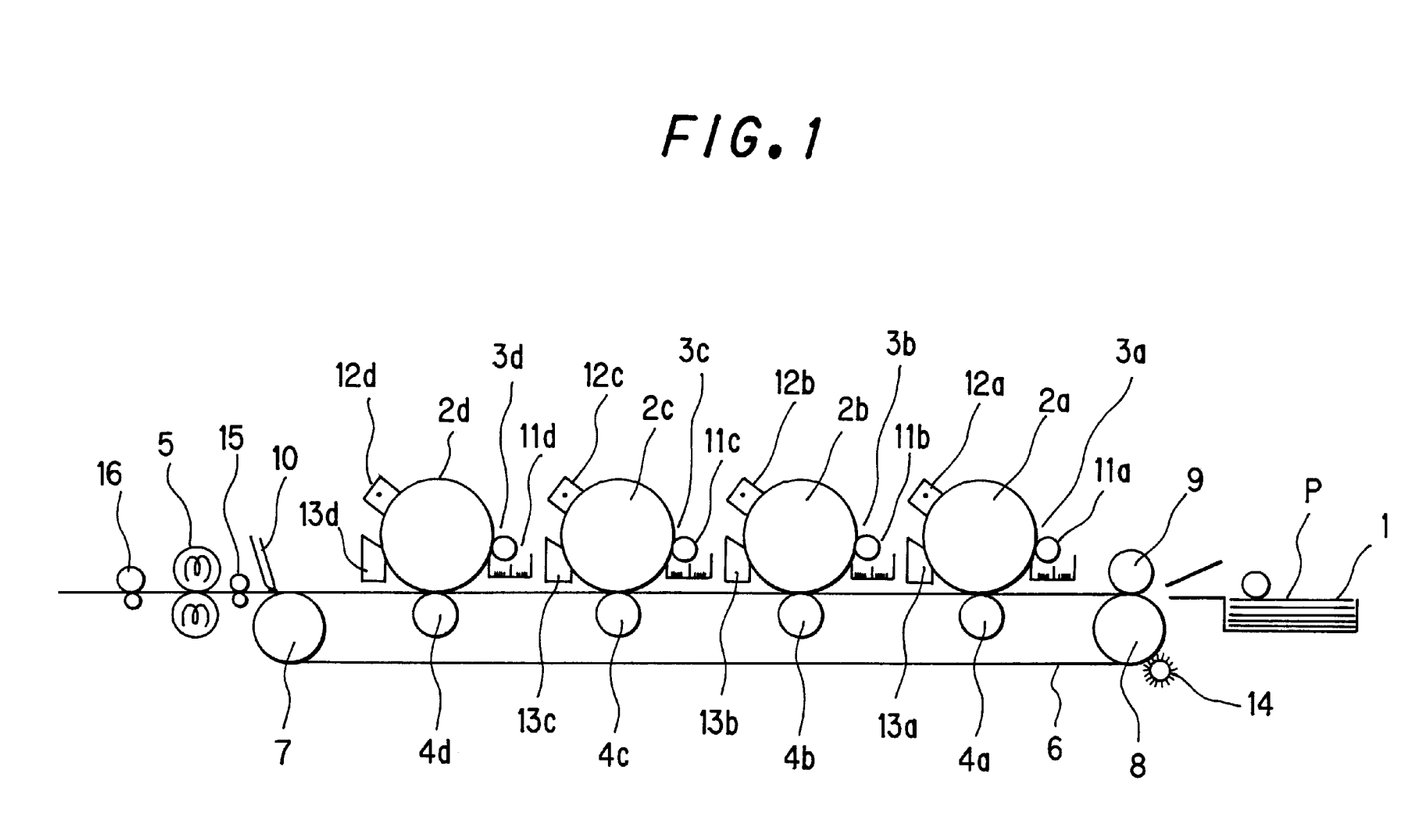
FIG. 1 is a an illustrative side view showing the basic configuration of a color image forming apparatus of the present invention.

This color image forming apparatus includes: as shown in FIG. 1, a paper supplying portion 1 for storing and supplying sheets of paper P as print media onto which an image is formed with toner; photoreceptor drums 2a to 2d each forming a static latent image for imaging; developing units 3a to 3d for supplying the toner to the static latent images on photoreceptor drums 2a to 2d; transfer rollers 4a to 4d for successively transferring the developed images with toner onto paper P whilst the paper is being conveyed; and a fixing unit 5 for fusing the transferred toner image and fixing it to paper P.

An endless dielectric belt 6 for conveying paper P from paper supplying portion 1 to fixing unit 5 is laid between photoreceptor drums 2a to 2d and transfer rollers 4a to 4d opposing respective photoreceptor drums 2a to 2d and wound on and between a driving roller 7 and an idle roller 8.

Provided on the upstream side, with respect to the conveyed direction of paper P, of dielectric belt 6 is a metal roller 9 which is grounded. Separation claws 10 for forcibly separating paper P which has been electrostatically attracted to the dielectric belt are provided on the downstream side.

Separation claws 10 are provided so as to be able to move in and out of contact with the surface of dielectric belt 6.

Each photo receptor drum 2a–2d is a grounded, conductive pipe of aluminum with an OPC (organic photoconductor) film applied thereon.

Developing units 2a to 2d hold respective colors of toner, i.e., yellow, magenta, cyan and black and have respective developing rollers 11a to 11d for supplying the colors of toner to photoreceptor drums 2a to 2d.

Provided around each photoreceptor drum 2a–2d are a charger 12a–12d for electrifying the surface of photoreceptor drum 2a–2d, a developing unit 3a–3d and a cleaning blade 13a–13d for cleaning the leftover toner remaining on the drum after the toner image has been transferred to paper P by transfer roller 4a–4d.

A charge erasing means 14 is provided facing dielectric belt 6 on the idle roller 8 side in order to erase the static charge on dielectric belt 6 immediately after the toner image of the final color has been transferred to paper P.

Each charger 12a–12d electrifies the surface of photoreceptor drum 2a–2d. Each photoreceptor drum 2a–2d is exposed to light by unillustrated exposure means so that a static latent image is formed thereon. The thus formed static latent image on each drum is supplied with the toner from developer roller 11a–11d of developing unit 3a–3d to form the toner image. The thus formed toner images are successively transferred by respective transfer rollers 4a to 4d onto paper P which is conveyed by dielectric belt 6. The paper P with all colors of toner images transferred thereon is conveyed into fixing unit 5, where the toner image is fixed to the paper Accordingly, in the case of color image formation, a single color toner image is transferred to paper P as it passes through photoreceptor drums 2a–2d whilst being statically attracted to and conveyed by dielectric belt 6. Thus, one multi-color image is formed by a single pass of dielectric belt 6.

Fixing unit 5 is composed of fixing rollers for fusing the toner image and fixing it onto paper P at the predetermined temperature under the predetermined pressure. Provided upstream of fixing unit 5 are guide rollers 15 for guiding the paper P separated from dielectric belt 6 by separation claws 10 to fixing unit 5, while discharge rollers 16 for discharging the paper P outside the machine after fixing are provided downstream of fixing unit 5.

Figure 2:
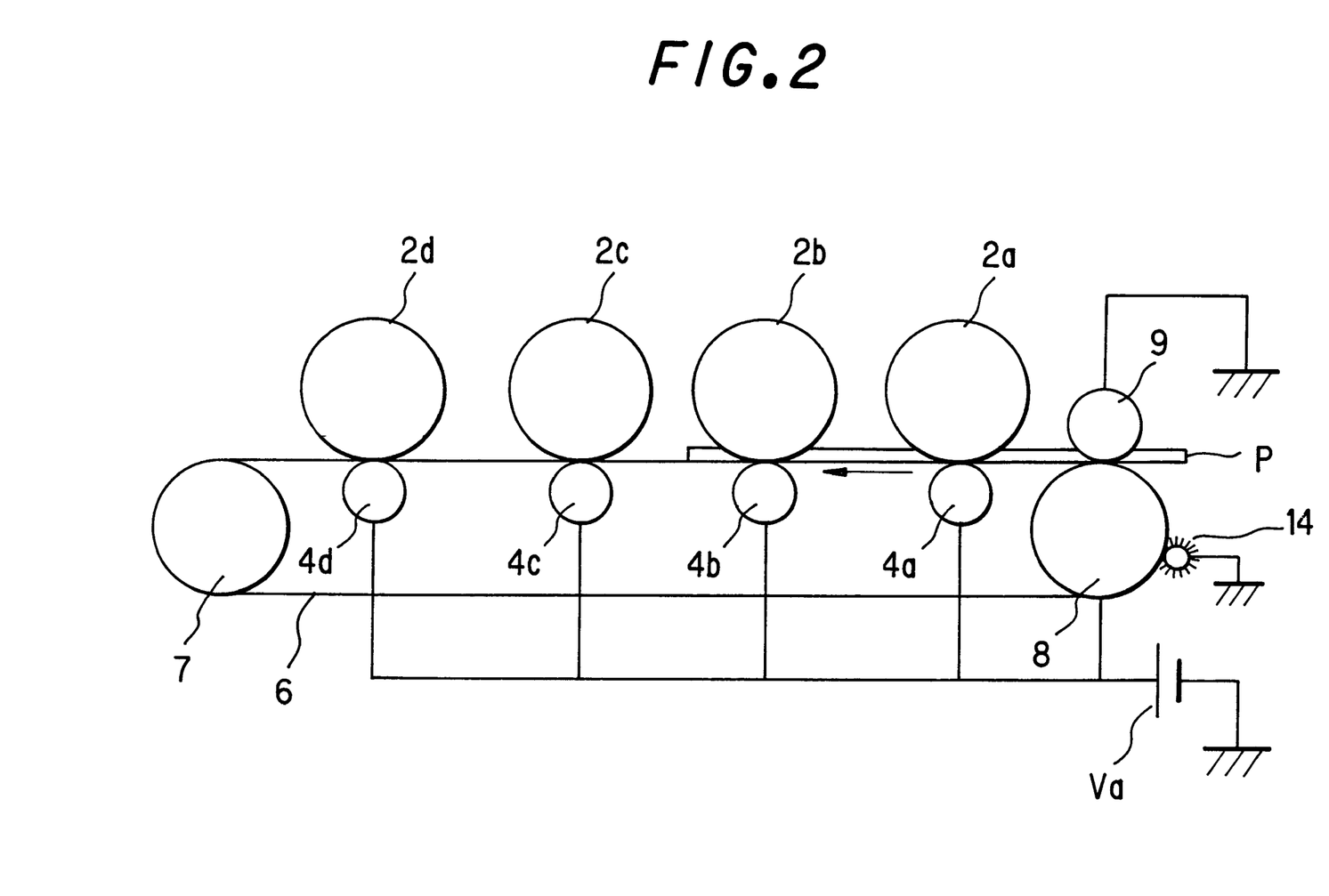
FIG. 2 is a an illustrative side view showing the first embodiment of a color image forming apparatus of the present invention.

Referring next to FIG. 2, the configuration of the toner transfer station in the embodiment of the color image forming apparatus of the present invention will be described.

Endless dielectric belt 6 is formed of a high-polymer film such as PVDF (polyvinylidene fluoride) etc. Transfer rollers 4a to 4d are each a semi-conductive elastic roller formed of urethane rubber foam or a foamed elastomeric material, etc. These transfer rollers 4a to 4d are arranged so as to abut respective photoreceptor drums 2a to 2d with dielectric belt 6 in between.

In order to stably convey paper P, idle roller 8 around which dielectric belt 6 is tensioned is formed of a metal such as aluminum, and is applied with a voltage from a d.c. power source Va. In this arrangement, paper P is made to pass through grounded idle roller 8 (grounded through dielectric belt 6) and a grounded metal roller 9, whereby paper P is electrostatically attracted to dielectric belt 6.

The d.c. power source Va which supplies a d.c. voltage to idle roller 8 is also connected to transfer rollers 4a to 4d so as to apply the same voltage thereto.

Next, concerning the static attraction of paper P, electrification from contact between metal roller 9 and metallic idle roller 8 applied with a voltage, causes paper P to have charge of an opposite polarity to the applied voltage, thus paper P is statically attracted to dielectric belt 6.

This contact electrification is performed through Paschen discharge and charge injection.
(Paschen Discharge)

Figure 3:
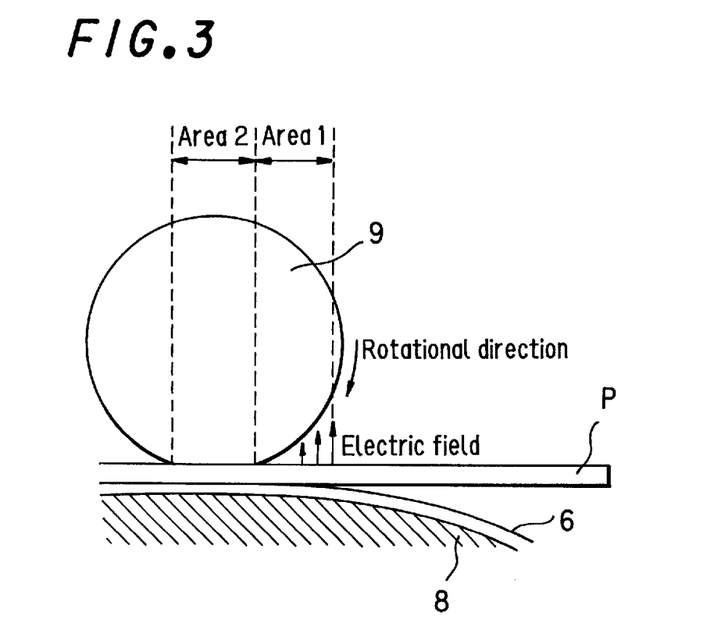
FIG. 3 is an illustrative view for explaining Paschen discharge, i.e., the areas and operations of charge injection.

As the distance between metal roller 9 and paper P becomes less and hence the electric field strength within the associated micro-space becomes greater, air breakdown will occur causing discharge (within area 1 in FIG. 3).

Since a positive/negative voltage is applied between idle roller 8 and metal roller 9 from d.c. power source Va, negative/positive charges build up on paper P on the side opposing metal roller 9 when a discharge occurs.
(Charge Injection)

After passing the discharge area, charge injection occurs in the nip between dielectric belt 6 and metal roller 9 (within area 2 in FIG. 3) so that a further charge builds up on paper P.

Figure 4:
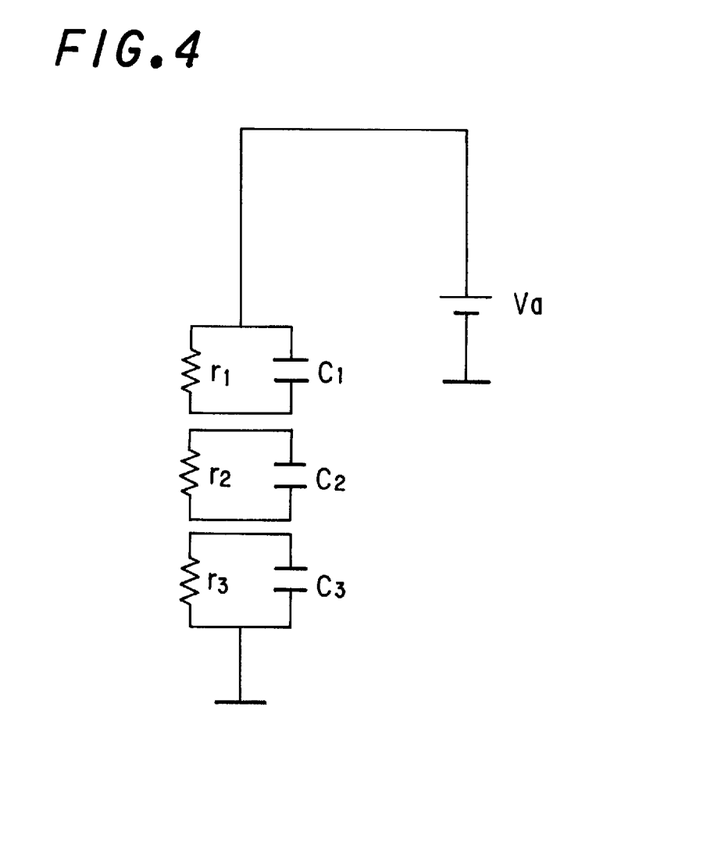
FIG. 4 is a circuit diagram showing an equivalent circuit to the injection apparatus shown in FIG. 3.

FIG. 4 shows an equivalent circuit during this charge injection.

In this circuit, alphanumeric symbols designate: Va a d.c. power source; r1 resistance of dielectric belt 6; r2 resistance of paper P;. r3 contact resistance between paper P and metal roller 9; c1 capacitance of dielectric belt 6; c2 a capacitance of paper P; and c3 capacitance between paper P and metal roller 9.

In order to determine the amount of charge accumulated on paper P(or the potential thereof), assuming the amount of charge (the potential) obtained from the Paschen discharge to be equal to the initial potential in the equivalent circuit, the potential difference (V1) across c2 can be solved. The electrostatic potential of paper P is expressed as the total of that derived from the Paschen discharge and that derived from the charge injection. The analytic formula of the final electrostatic potential V1 across c2 can be expressed as formula (1)

$$V1 = A \times (b' \times e^{Bt} - c' \times e^{Ct}) \quad (1)$$

where A, B, C, b' and c' are constant values depending upon the circuit (depending upon the resistance and capacitance etc. in each layer). Accordingly, final electrostatic potential V1 can be expressed by the sum of exponential functions dependent on the time (passage time t) for a point to pass through area 2, and hence varies depending on the passage time t.

The charge (the potential) accumulated on the surface of paper P is electrostatically attracted to the charge of an opposite polarity generated in the interior or exterior of the surface of dielectric belt 6 and so the paper adheres to the dielectric belt 6 from electrostatic force. That is, it is considered that the higher the electrostatic potential on paper P, the greater the electrostatic attractive force to dielectric belt 6.

Here, conductive metal roller 9 is used for contact electrification, a conductive cylindrical or comb-like brush may provide the same effects based on the same contact electrification principle.

Next, the mechanism of the electrostatic transfer of toner will be described in detail.

Figure 5:
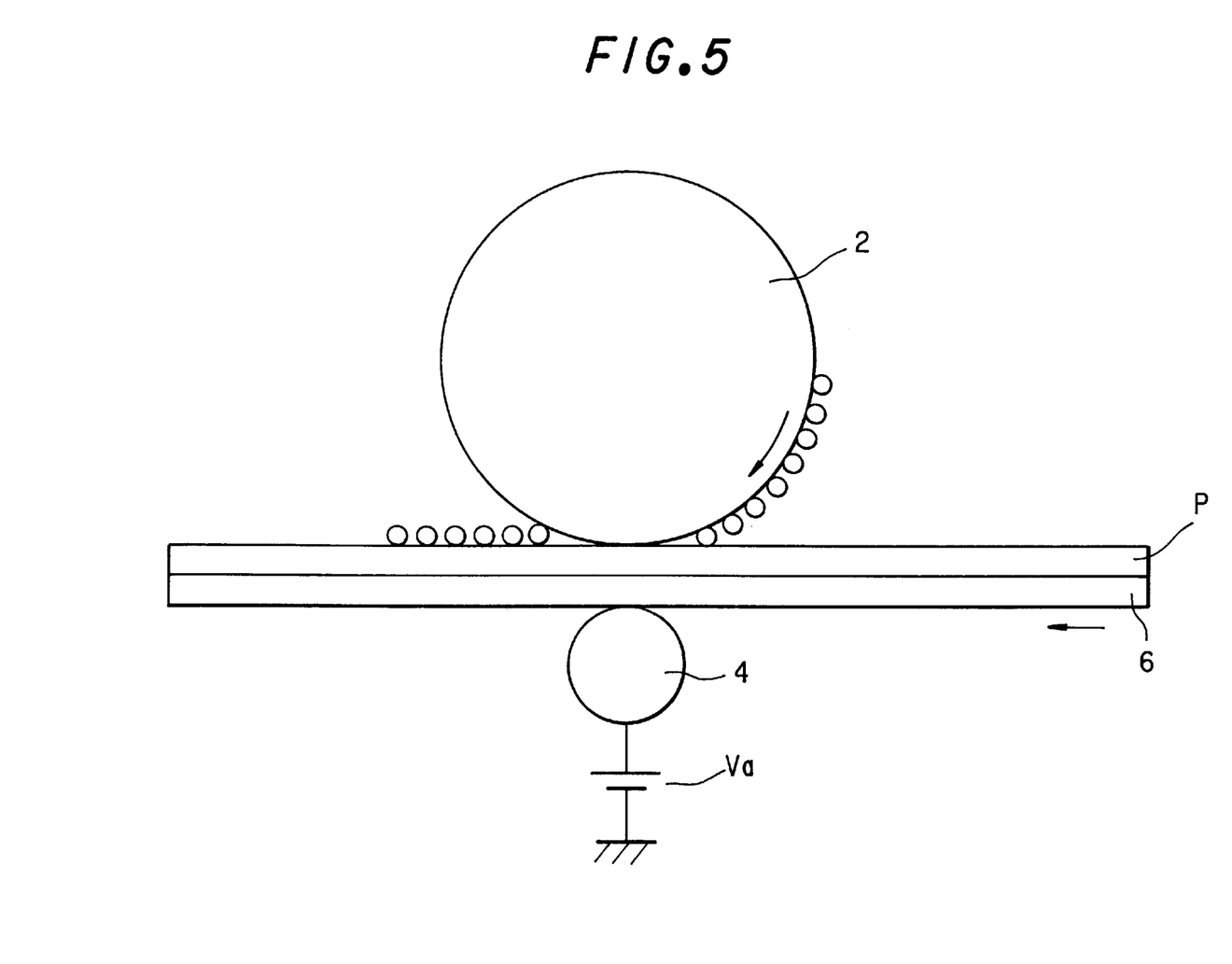
FIG. 5 is an illustrative view showing the operation during toner transfer.

As shown in FIG. 5, the electrostatic transfer of toner is understood to be dependent on the transfer electric field and the contact width between transfer roller 4 and photoreceptor drum 2. In other words, the stronger the electric field within the toner layer on photoreceptor drum 2 (the greater the voltage applied to transfer roller 4), the more the toner moves to paper P. To apply a stronger electric field to the interior of the toner layer, the applied voltage (d.c. voltage) Va may be enhanced. Other than this, the volume resistivity of transfer roller 4 may be adjusted to produce an effective transfer electric field inside the toner layer. To enhance the transfer electric field inside the toner layer, the volume resistivity of transfer roller 4 needs to be lowered, thus making it possible to have the same effect as that obtained when the applied voltage Va is increased.

In the case of multi-color toner transfer, the second color of toner and those following need to be transferred onto the already transferred toner layer. Therefore, the paper P having the toner transferred thereon has a greater effective thickness than that of a normal one. If the same transfer station voltage is applied at all the stages, the electric field penetrating through the toner layer (the toner on photoreceptor drum 2) to be transferred to paper P gradually decreases from one station to the next. Therefore, it is necessary to provide a stronger electric field from one station to the next as the toner layer on paper P becomes thicker.

As shown in FIGS. 1 and 2, charge erasing means 14 for dielectric belt 6 is disposed upstream of the electrostatic attracting portion (composed of metal roller 9 and idle roller 8) where paper P is attracted thereto, and it is adapted to operate as soon as the final color of toner has been electrostatically transferred.

More specifically, when paper P has been conveyed over dielectric belt 6 and as soon as the paper has undergone the final transfer stage at the nip between photoreceptor drum 2d and transfer roller 4d, charge erasing means 14 located near the electrostatic attracting portion is activated. As a result, the charge erased portion of dielectric belt 6 will reach the paper feed station of the next paper P without any loss of time, thus it is possible to perform a conveying and transfer operation effectively. Thus, this configuration improves the processing speed.

Charge erasing means 14 can be of a conductive material, and if so, it is possible to erase the charge on dielectric belt 6 more efficiently. In the above description, charge erasing means 14 is grounded, but the charge erasing means (charge erasing brush) may be applied with a voltage of an opposite polarity to that of the charge to be removed in some embodiments, depending upon the volume receptivity of dielectric belt 6, the surrounding environment for the transfer process and the volume resistivity of the transfer means. (The first embodiment where the effective electric field penetrating through the toner layer on the photoreceptor is adjusted)

Transfer rollers 4a–4d are adapted so that the more upstream, with respect to the conveyed direction of the paper, the roller resides, the higher volume resistivity the roller will have. This configuration enables the more downstream transfer rollers, applied with the same voltage, to provide a stronger transfer electric field.

Using transfer rollers 4a–4d having the following volume resistivities, an experiment for evaluating the transfer behaviors was carried out. The result was evaluated based on the image quality. From this experiment, the optimal volume resistivities of transfer rollers 4a–4d were found to be within the following ranges.

The evaluation was performed based on the amount of the leftover toner on photoreceptor 2 after the transfer operation. That is, the transfer efficiency can be calculated by the following formula (2). The image quality was determined to be good when this calculation was equal to 95% or above.

(Transfer efficiency from the photoreceptor drum to the paper(%))={(The amount of the toner on the photoreceptor drum before transfer (g/S))–(The amount of the toner on the photoreceptor drum after transfer (g/S))}×100/(The amount of the toner on the photoreceptor drum before transfer)     (2)

g/S: the amount of toner per unit area Volume resistivity for transfer roller 4a for the first color, $\rho v1$: $10^9$ to $10^{11}$ Ω cm Volume resistivity for transfer roller 4b for the second color, $\rho v2$: $10^7$ to $10^9$ Ω cm Volume resistivity for transfer roller 4c for the third color, $\rho v3$: $10^5$ to $10^7$ Ω cm Volume resistivity for transfer roller 4d for the fourth color, $\rho v4$: $10^3$ to $10^5$ Ω cm.

When the volume resistivities of transfer rollers 4 satisfy the above conditions and also meet the relation $\rho v1 > \rho v2 > \rho v3 > \rho v4$, beneficial transfer and image quality were obtained. With the volume resistivities outside the above ranges, the transfer efficiency turned out to be lower than that in the configuration with the above volume resistivities.

In conclusion, when transfer rollers 4 are set up so that the volume resistivities of transfer rollers 4 become smaller as they are located downstream even with the applied voltage Va at the fixed level, a stronger electric field can be applied to the interior of the toner layer to be transferred. Thus it is possible to perform beneficial transfer.

(The second embodiment where the effective electric field penetrating through the toner layer on the photoreceptor is adjusted)

Figure 6:
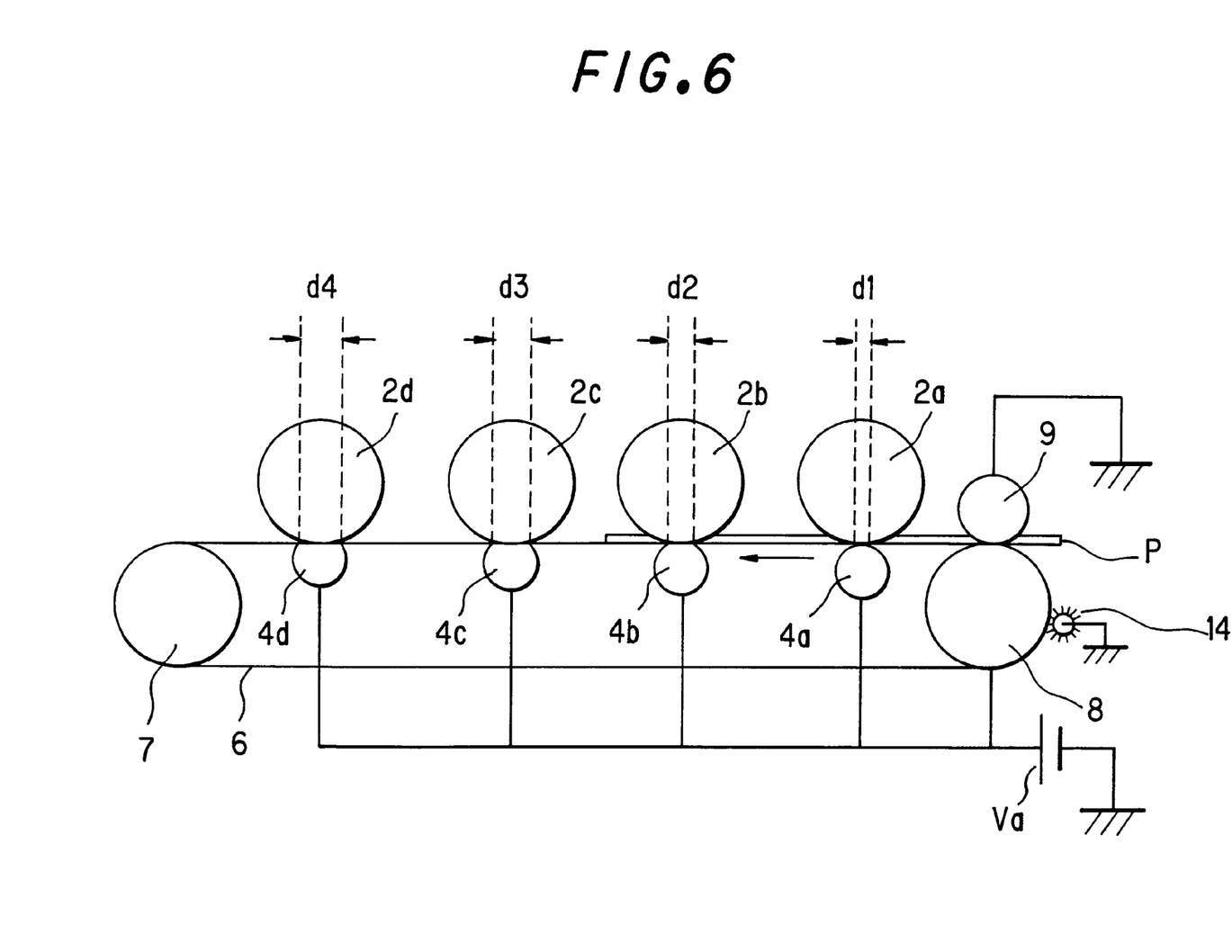
FIG. 6 is a an illustrative side view showing the second embodiment of a color image forming apparatus of the invention.

As shown in FIG. 6, the contact width between paper P and photoreceptor drum 2 (the nip width of transfer roller 4) is made greater from the upstream side to the downstream side, whereby it is possible to make longer the time during which the transfer electric field is applied through the interior of the toner layer on photoreceptor drum 2.

Using transfer rollers 4a–4d having the following contact widths with the same applied voltage thereto, an experiment for evaluating the transfer behaviors was carried out. The result was evaluated based on the image quality. From this experiment, the optimal contact widths of transfer rollers 4a–4d were found to be within the following ranges.

The evaluation was performed based on the amount of the leftover toner on photoreceptor 2 after the transfer operation. That is, the transfer efficiency can be calculated by the aforementioned formula (2). The image quality was determined to be good when this calculation was equal to 95% or above.

Contact width between transfer roller 4a and photoreceptor drum 2a for the first color, d1: 1.5–2.5 mm Contact width between transfer roller 4b and photoreceptor drum 2b for the second color, d2: 2.0–3.0 mm Contact width between transfer roller 4c and photoreceptor drum 2c for the third color, d3: 2.5–3.5 mm Contact width between transfer roller 4d and photoreceptor drum 2d for the fourth color, d4: 3.0–4.0 mm When the contact widths (the nip widths) of transfer rollers 4 satisfy the above conditions and also meet the relation d1<d2<d3<d4, beneficial transfer and image quality were obtained. With the contact widths outside the above ranges, the transfer efficiency turned out to be lower than that in the configuration with the above contact widths.

In conclusion, when transfer rollers 4a–4d are set up so that the contact widths of transfer rollers 4a–4d become greater as they are located downstream even with the applied voltage Va at the fixed level, the time during which the effective electric field is applied to the interior of the toner layer to be transferred can be adjusted appropriately. Thus it is possible to perform beneficial transfer.

It is also possible to provide a configuration in which toner transfer is performed in combination of the first and second embodiments. In this case, it is possible to obtain an effect equivalent to the first or second embodiment or greater than those.

Figure 7:
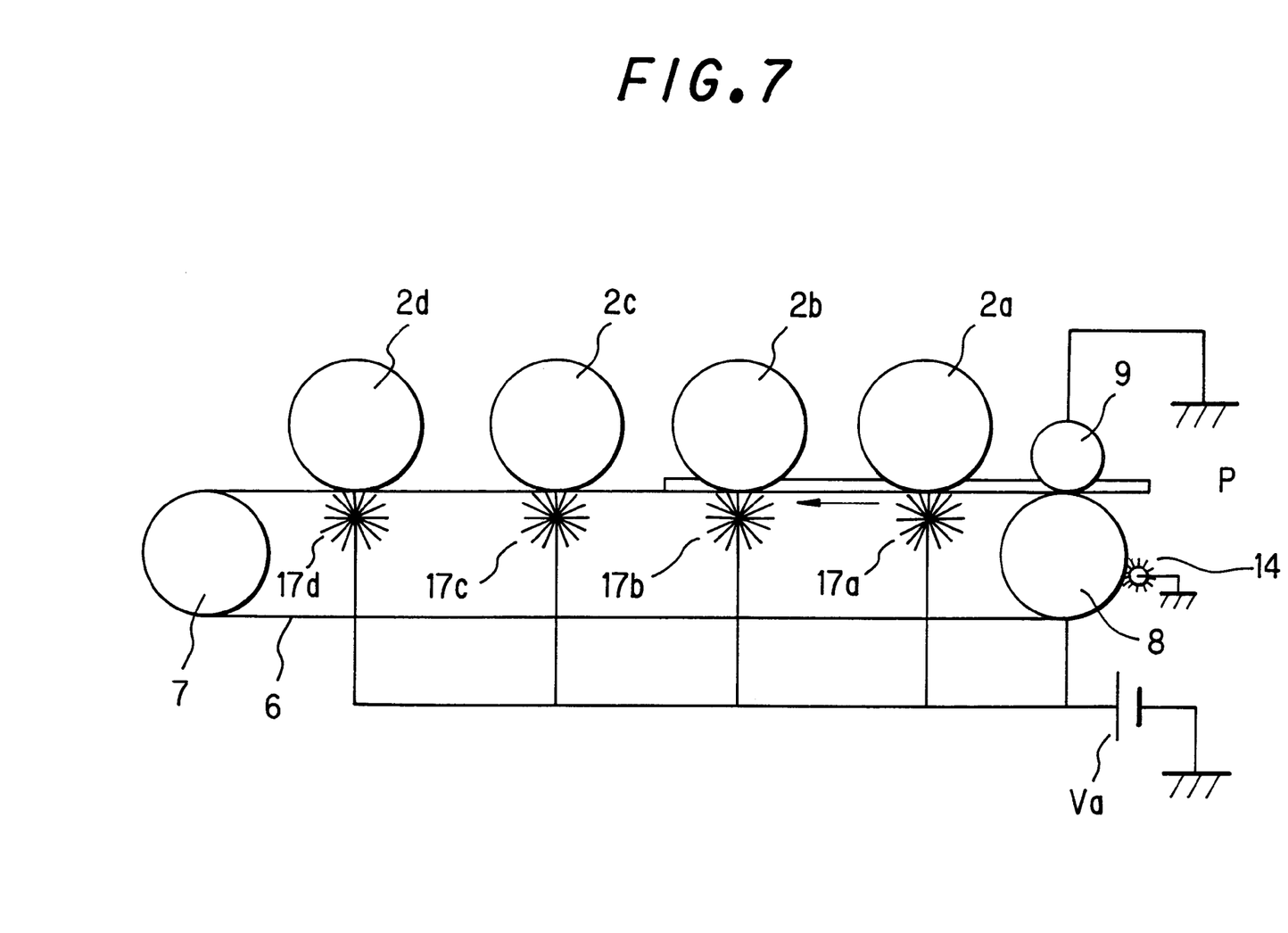
FIG. 7 is a an illustrative side view showing the third embodiment of a color image forming apparatus of the invention.

The third embodiment of the present invention will be explained with reference to FIG. 7. Instead of the elastic transfer rollers used in the first and second embodiments, conductive brushes 17a–17d are used as the transfer means. When the volume resistivities of conductive brushes 17a–17d are set equal to those of transfer rollers 4a–4d in the first embodiment, the same effect as in the first embodiment can be obtained.

Figure 8:
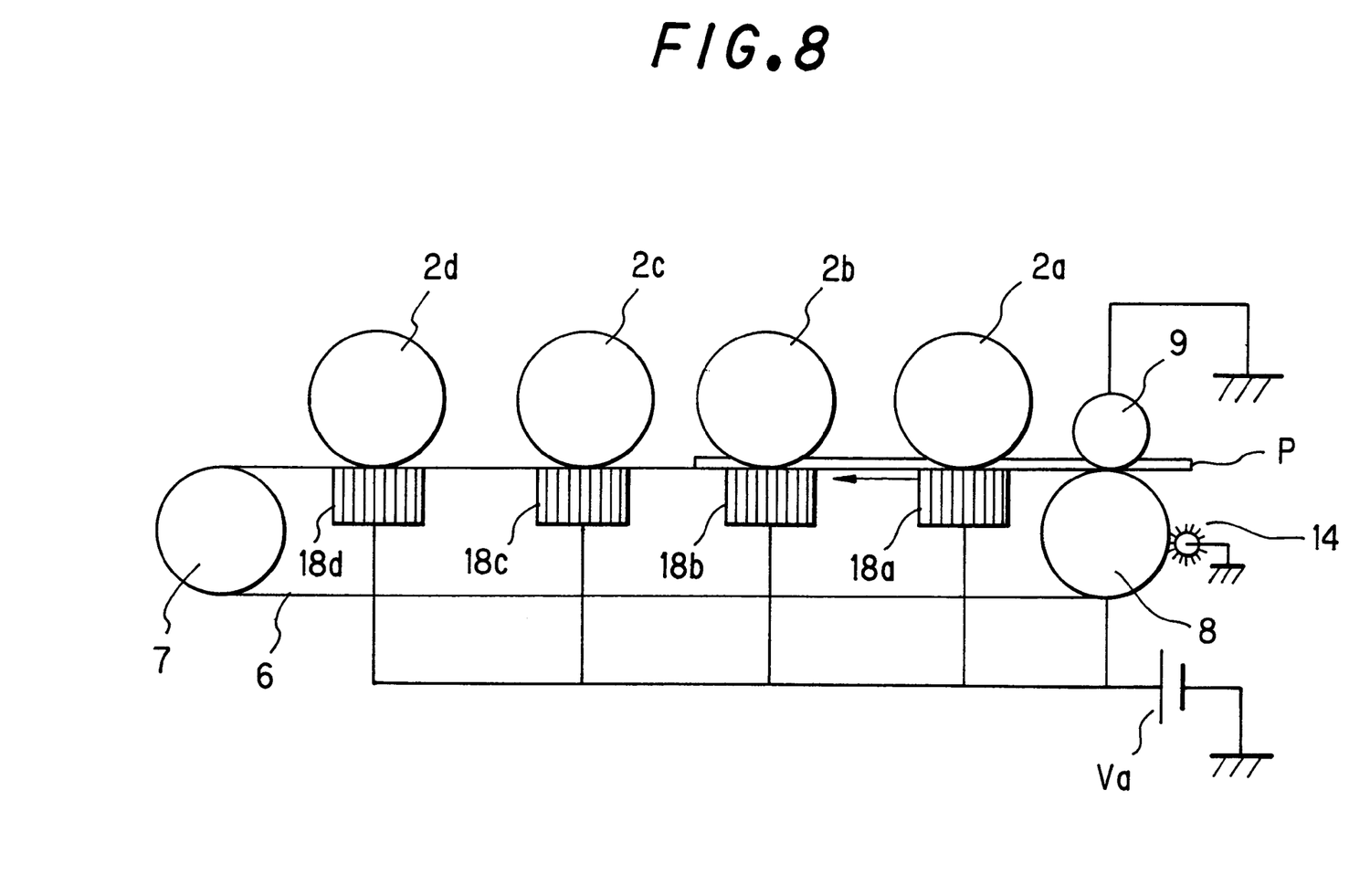
FIG. 8 is a an illustrative side view showing the fourth embodiment of a color image forming apparatus of the invention.

The fourth embodiment of the present invention will be explained with reference to FIG. 8. Instead of the elastic transfer rollers used in the first and second embodiments, conductive comb-like transfer elements 18a–18d are used as the transfer means. When the volume resistivities of conductive comb-like transfer elements 18a–18d are set equal to those of transfer rollers 4a–4d in the first embodiment, the same effect as in the first embodiment can be obtained.

In accordance with the color image forming apparatus having the above first feature, a plurality of the transfer means are of an elastic material and arranged so as to be in contact with the dielectric belt while a common d.c. power source is used as the power source for the multiple transfer means and for the charging means. As a result it is possible to effect toner transfer and electrostatic attraction of print media with a single power source, and hence make the apparatus compact. This single power source configuration realizes stable electrostatic attraction and also provides stable toner transfer. Further, the use of the d.c. voltage for application enables beneficial toner transfer.

In accordance with the color image forming apparatus having the above second feature, since the volume resistivities of the multiple transfer means are set higher successively toward the upstream side, the provision of only a single power source makes it possible to produce a transfer electric field suitable for the toner layer on each image support and hence achieve stable toner transfer.

In accordance with the color image forming apparatus having the above third feature, since the volume resistivities of the multiple transfer means are set higher successively toward the upstream side within the range from $10^3$ to $10^{11}$ Ω cm, the provision of only a single power source makes it possible to produce a transfer electric field suitable for the toner layer on each image support and hence achieve stable toner transfer.

In accordance with the color image forming apparatus having the above fourth feature, since the plurality of the transfer means are of an elastic roller form and the contact widths of the rollers with the dielectric belt are set narrower successively toward the upstream side, the provision of only a single power source makes it possible to produce a transfer electric field suitable for the toner layer on each image support and hence achieve stable toner transfer. As a result, the same roller can be used for all the units, that is, it can be used as a common part.

In accordance with the color image forming apparatus having the above fifth feature, since the contact widths of the rollers with the dielectric belt are set narrower successively toward the upstream side within the range from 1.5 mm to 4 mm, the provision of only a single power source makes it possible to produce a transfer electric field suitable for the toner layer on each image support and hence achieve stable toner transfer.

In accordance with the color image forming apparatus having the above sixth feature, since the charging means is formed of a conductive roller, or comb-like or cylindrical brush, the charging means may use the same common parts as the transfer means while it is also possible to effectively provide the required electrostatic potential to electrostatically attract the print media to the dielectric belt.

What is claimed is:

1. A color image forming apparatus comprising:

a plurality of image supports adapted to have toner images formed thereon;

a plurality of transfer means arranged in series so as to be opposed to corresponding ones of said image supports and adapted to cause toner images formed on said image supports to transfer to a print medium;

a continuously driven, endless dielectric belt, said dielectric belt being disposed between said plurality of image supports and said plurality of transfer means;

wherein a plurality of toner images formed on respective ones of said plurality of image supports are successively transferred to said print medium conveyed by said dielectric belt so as to form a color image on said print medium, said color image forming apparatus being further characterized in that:

said plurality of transfer means each comprise an elastic roller and each is arranged so as to be in contact with said dielectric belt;

a common d.c. source is connected to each of said plurality of transfer means, and each of said elastic rollers engages said dielectric belt at a contact region having a width, and the width of the contact region associated with each said elastic roller and said dielectric belt is set narrower successively toward the upstream side of said dielectric belt.

2. The color image forming apparatus according to claim 1, wherein the volume resistivities of each of said plurality of transfer means are set higher successively toward the upstream side.

3. The color image forming apparatus according to claim 2, wherein the volume resistivities of each of said plurality of transfer means are set higher successively toward the upstream side within the range from $10^3$ to $10^{11}$ Ω cm.

4. The color image forming apparatus according to claim 1, wherein the widths of the contact regions associated with each of said elastic rollers and said dielectric belt are set narrower successively toward the upstream side within the range from 1.5 mm to 4 mm.

5. The color image forming apparatus of claim 1, further comprising:

charging means connected to said common d.c. source and disposed upstream of said plurality transfer means for causing said dielectric belt to electrostatically attract print media thereto; and charge erasing and cleaning means disposed upstream of said charging means for erasing a charge on said dielectric belt and cleaning leftover toner therefrom.

6. The color image forming apparatus according to claim 5, wherein said charging means is formed of one of the group consisting of a conductive roller, a comb-like brush, and a cylindrical brush.

* * * * *